Oct. 31, 1950 M. H. WEST 2,528,403
SEPTIC TANK TREATMENT OF SEWAGE
Filed July 15, 1949
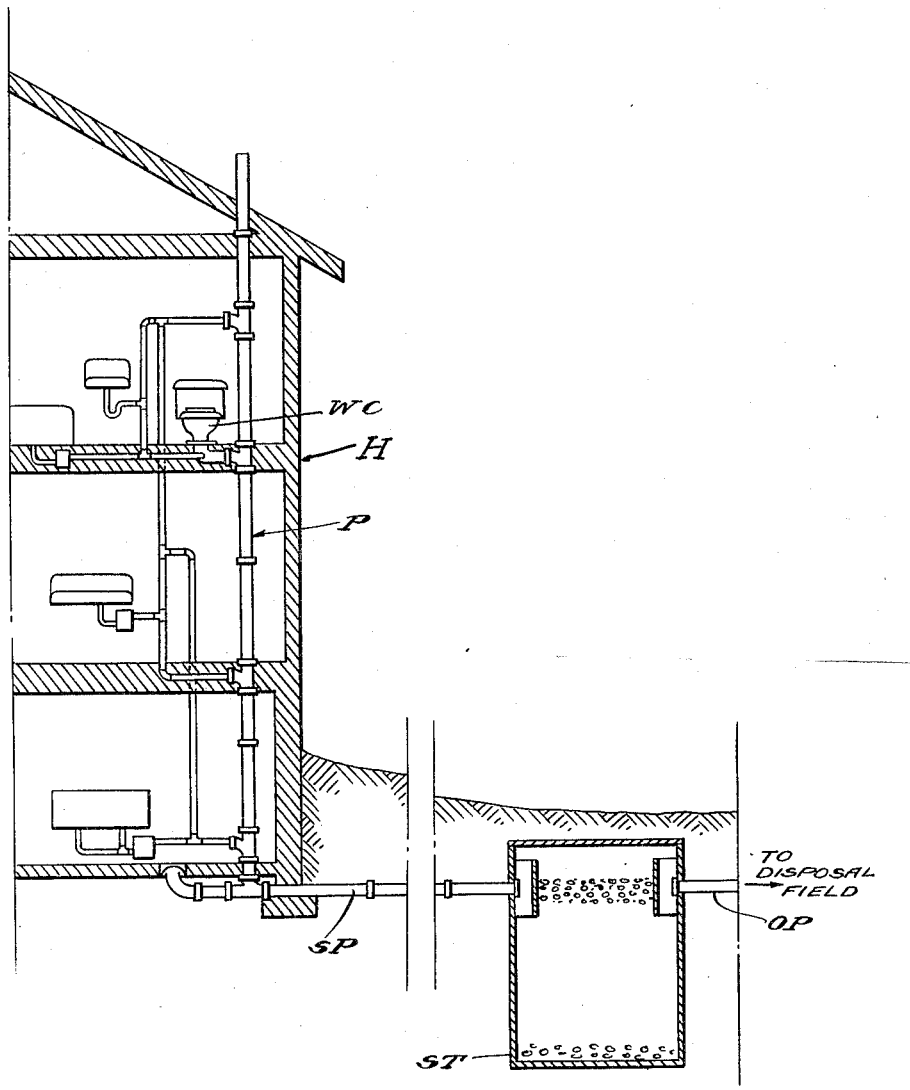
INVENTOR.
Max H. West
BY Leech & Radue
Attorneys.

Patented Oct. 31, 1950

2,528,403

UNITED STATES PATENT OFFICE 2,528,403

SEPTIC TANK TREATMENT OF SEWAGE

Max H. West, Fayetteville, Pa.

Application July 15, 1949, Serial No. 105,036

5 Claims. (Cl. 210—6)

This invention pertains to the treatment of sewage in septic tanks and particularly to the improvement of sewage sludge digestion.

The treatment of domestic sewage by bacterial action has for many years been the subject of empirical experimentation and scientific analysis. The biological or bacterial action involved is one of digestion or clarification. In the course of such action organisms or bacteria serve to convert putrescible organic matter in the sewage to an innocuous condition. Therefore, in the septic tank process of sewage treatment the exclusion of air and light is the means for inducing the growth of anaerobic bacteria.

The effluent from the septic tank flows to a disposal field where its disposition in the upper layer of the soil exposes it to the purifying action of aerobic bacteria. These bacteria, which need air for growth, are found in the upper three-foot layer of soil. If the effluent remains long enough in this layer the aerobic bacteria will convert the dangerous sewage and disease germs into harmless matter.

Even though the septic tank may be of sufficient capacity to allow the sewage to remain therein for the 24 hours usually required for anaerobic digestion, conditions often occur that cause the sewage sludge to be pushed out into the disposal field. The principal effect of these conditions is to kill and weaken the anaerobic bacteria, thus impairing their digesting action and resulting in a too dense and too thick sludge scum at the top of the liquid in the tank. Strong acids and dishwater are the most common causes of unsatisfactory bacterial action in the septic tank systems.

Many different treatments have been proposed for, and many substances have been added to, septic tanks to insure their continued efficiency under adverse conditions. It is known to add yeast to promote bacterial action and it is common practice to seed a freshly cleaned or a new septic tank with a portion of sludge taken from a going system. Metallic hydroxides, metal salts, lime, sodium nitrate and many other compounds have been employed to obtain a desired acid or alkaline condition and to thereby improve the anaerobic bacteria action. More recently, activated carbon has been used as a promoter of decomposition in septic tanks.

After considerable study and experimentation I have discovered that domestic septic tanks can be maintained in a highly efficient condition without the necessity for cleaning by treating them periodically with a preparation that stimulates anaerobic action, nourishes the bacteria, and acts directly on the sludge at the top of the tank. My novel preparation is effective over long periods, and can be introduced into the tank simply by flushing it into the sewer connection. This preparation comprises a finely divided mixture of an activating substance, a nutrient substance, and a floating agent that will suspend and carry the said two substances to positions of maximum utilization.

It is therefore the object of my invention to provide an improved method for the treatment of sewage in septic tanks, and a novel and useful mixture for feeding and stimulating the bacteria in such tanks.

More specifically stated, it is the purpose of my invention to treat and condition domestic sewage in septic tanks by introducing thereinto a mixture that will activate the bacteria, nourish the bacteria and provide a vehicle for presenting activating and nourishing substances to bacteria in the liquid and particularly at the upper part of the tank.

The nature and principles of my invention can be most readily explained by reference to the accompanying drawing, the single figure of which is a diagrammatic representation of a typical septic tank installation.

In this figure a house H having two upper floors and a basement is provided with a plumbing system P including a sewer pipe SP discharging into the top of a septic tank ST. The tank ST discharges at a somewhat lower level through an outlet pipe OP leading to a conventional disposal field that is not shown.

The plumbing system P includes a second floor water closet WC of conventional form and construction.

The liquid-filled septic tank ST is shown as having a relatively thin bottom deposit of sludge and a relatively thick floating layer of sludge or scum. The tank solution in between is full of anaerobic bacteria.

When the floating top layer becomes of such thickness (approximately 18 inches) that it extends below the baffled opening of the outlet pipe OP the sludge will be forced into the disposal field, clogging the filtering tile pipes thereof and requiring digging up and replacement.

This trouble and expense can be avoided by periodically treating the septic tank at infrequent intervals in the following manner.

A properly proportioned powdered mixture is prepared comprising sawdust, dry yeast and a dry nutrient cereal or the like. The average fineness of this mixture approximates that of medium ground corn meal. It is of advantage to have the sawdust in the form of relatively fine and relatively coarse particles (about twice as coarse as wheat flour).

A measured amount of this dry mixture, determined by the capacity of the septic tank, may be easily introduced by dumping it in the water closet or toilet WC and flushing it down with water. In order to understand the nature of the action of treatment with this mixture in conditioning septic tanks and improving the action of the anaerobic bacteria, it will be necessary to consider in more detail the operation of such tanks.

When fecal solid matter is flushed into a septic tank it goes first to the bottom and remains there for awhile, after which it floats to the top. Every tank has settling and rising periods. When the solids rise to the top they either form sludge or are converted into liquid. Any material formation of floating sludge is due to the fact that for one reason or another the bacteria in the tank are weak or otherwise incapable of completely digesting the solids. While acids will break up the sludge scum, they tend to kill the working bacteria and attack metal tanks. Where the bacteria can be maintained in a high state of vigor and activity a heavy sludge will not form and the thin digested liquid discharged will not clog the disposal field. This is the useful result obtained with the novel treatment of my invention.

While not intending to be limited by any particular theory of operation, experimentation and observation over a considerable period leads me to believe that the following action takes place. The treating mixture is thoroughly mixed and largely wet by the flushing from the toilet into the septic tank. The flushing is accomplished by a substantial head of water so that the mixture enters the top of the tank with considerable force and is directed to the bottom by the baffle formation at the discharge end of the sewer pipe SP. All of the introduced mixture does not rise to the top immediately. Only the relatively free sawdust filler floats immediately to the top, carrying some of the yeast and some of the cereal that have adhered to it in the flushing and tank injection period. The remaining portion of the wetted mixture settles to the bottom of the tank, but every time the toilet or any other plumbing fixture is vigorously flushed, water enters the tank with considerable force, causing some of the mixture that has settled to circulate through the tank. In so doing the mixture is picked up by the sludge at the top of the tank and activates and feeds the bacteria therein. This feeding is greatly aided during the rising period of the solid matter which picks up more of the mixture from the tank bottom. In this way the action of the anaerobic bacteria in the tank is vigorously stimulated immediately upon introduction of the treatment mixture, so that a sluggish system can be quickly restored to an efficient condition. The system will continue to be maintained in this efficient condition over a period of months by reason of the fact that the solids will keep raising some of the mixture to the upper sludge zone, and because soaking will break up the portion of the mixture that first settled on the bottom and produce a delayed release of sawdust particles carrying yeast and bacteria food. Any non-floating sludge at the bottom of the tank will also receive the benefit of the mixture lying on the bottom.

The treatment of a 200-gallon metal tank containing about 185 gallons of liquid will be described as a specific example of the method and treating mixture of this invention.

A basic powdered mixture consisting of 1 part of sawdust, 3 parts of finely divided dry yeast and 9 parts of wheat flour by weight was prepared, and approximately 18 ounces of this mixture was flushed into the septic tank as one charge, in the manner previously described. The late evening is the preferred time for adding the small amount of mixture. Repetition of this treatment at approximate six-month intervals has kept this actively used septic tank system in good condition, without other attention, for a number of years.

Rye, barley or oat flour have been substituted for the wheat flour, or used in combinations therewith. The proportion of nutrient flour in the mixture with sawdust and yeast is kept the same. Potato flour or dried milk flour may also be used as a part or all of the nutrient flour component, but the cereal nutrients are considered preferable. The sawdust is a preferred form of floating agent that is of organic cellulosic character.

My novel treatment is also applicable to cesspools to improve the digestion and filtering action.

While the preferred method of treatment has been described in detail and preferred compositions and proportions have been fully set forth, it is to be understood that changes can be made in the method and variations can be made in the treatment mixture without departing from the principles of my invention and the scope of the appended claims.

Having thus described my invention, what I claim as novel and desire to secure by Letters Patent of the United States is:

1. The method of treatment of domestic sewage solids in an anaerobic digestion tank which includes the step of introducing a small amount of a finely divided mixture comprising sawdust as a floating agent, yeast and a nutrient flour for the anaerobic bacteria, whereby the sawdust will carry the yeast and nutrient flour to the top of the tank.

2. The method of treatment of septic tank sewage systems comprising forcibly injecting a small amount of a mixture of finely divided material including sawdust as a floating agent, yeast and a nutrient cereal downwardly into the anaerobic digestion tank, whereby the sawdust will float the yeast and nutrient cereal to the top of the tank.

3. The method of stimulating the digestion of sewage sludge by the action of anaerobic bacteria which consists in adding a finely divided mixture of nutrient cereal, yeast and a sawdust floating agent to the liquid medium carrying the sludge undergoing digestion, whereby the sawdust will carry the nutrient cereal and yeast to the top of the liquid medium.

4. In a septic tank sewage disposal system in which the action of bacteria is employed to produce digestion of the putrescible material, the improvement which consists in adding a finely divided mixture of sawdust floating agent, yeast and nutrient cereal flour for bacteria nourishment to such sewage and carrying out the bacterial digestion in the presence of said added mixture.

5. The method of treating domestic sewage solids in an anaerobic digestion tank having sewage sludge floating at the top of the liquid medium which includes periodically introducing into the liquid medium a finely divided treating preparation comprising cereal for feeding the anaerobic bacteria, yeast for stimulating said bacteria and sawdust as a floating agent, whereby some of the cereal and yeast when wetted will adhere to some of the sawdust and float up into the floating sludge.

MAX H. WEST.

REFERENCES CITED

The following references are of record in the file of this patent:

UNITED STATES PATENTS

| Number | Name | Date |
| --- | --- | --- |
| 525,819 | Takamine | Sept. 11, 1894 |
| 1,083,833 | Irwin | Jan. 6, 1914 |
| 1,791,918 | Yamaji | Feb. 10, 1931 |